UNITED STATES PATENT OFFICE.

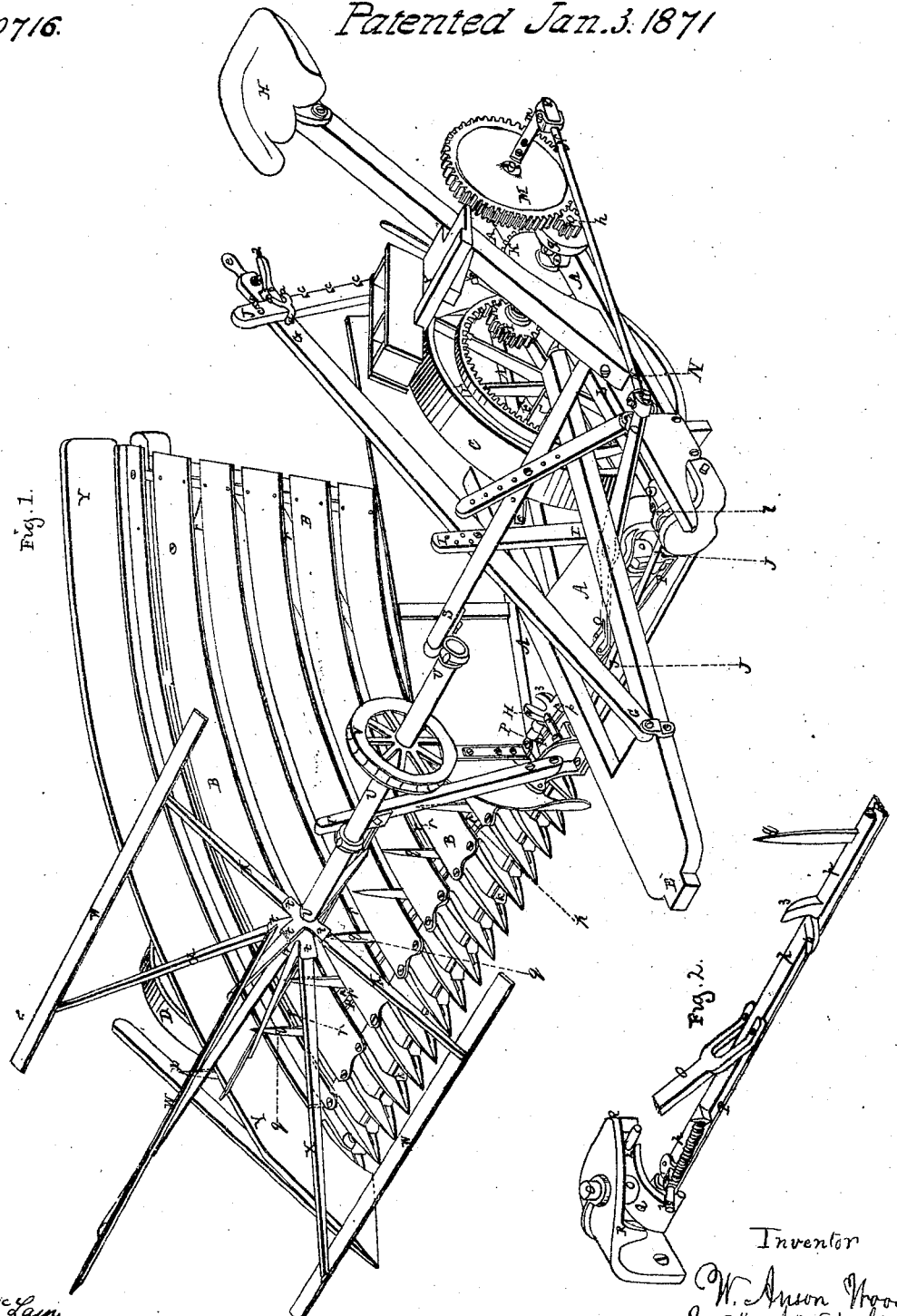

WILLIAM ANSON WOOD, OF HOOSICK FALLS, NEW YORK.

IMPROVEMENT IN HARVESTER-RAKES.

Specification forming part of Letters Patent No. 110,716, dated January 3, 1871.

*To all whom it may concern:*

Be it known that I, WILLIAM ANSON WOOD, of Hoosick Falls, in the county of Rensselaer and State of New York, have invented certain new and useful Improvements in Harvesting-Machines, and Rakes therefor; and I do hereby declare the following to be a full, clear, and exact description of the same, reference being had to the accompanying drawings, making a part of this specification, in which—

Figure 1 represents a perspective view of a harvesting-machine with the rake attached thereto. Fig. 2 represents, in perspective, a portion of the rake-operating mechanism detached from the machine to show its construction.

Similar letters of reference, where they occur in the separate figures, denote like parts of the machine in both of the drawings.

My invention relates to a harvesting-machine having a circular-shaped platform, to which is applied a rake, the teeth of which work in or through circular-shaped slots in said platform, and which rake is driven and turned by a vibrating lever operated from the main drive-wheel, the rake shaft or stale being underneath the platform, and the rake-teeth, when they have delivered the gavel and are about to return for another operation, turning toward the standing grain, and thus avoiding all entanglement with the grain being delivered.

To enable others skilled in the art to make and use my invention, I will proceed to describe the same with reference to the drawings.

The main frame A and the platform B are substantially united in one and supported on the main drive-wheel C, on the stubble side, and the supporting-wheel D next the standing grain, or on the grain side of the machine.

The tongue E is hinged at or near the line of the axle F of the drive-wheel, and from a point far forward on the said tongue a lever, G, extends back to or near to the driver's seat H, for the purpose of raising and lowering the cutters, as follows: A connecting-bar, I, unites the lever to the main frame, and a loop, *a*, on the rear of the lever passes over a post, J, and a spring-catch, *b*, on the lever takes into one of the notches *c* in the post J, so that the driver from his seat, by taking the catch-lever *d* and the handle *e* of the lever G in his hand or grasp, releases the catch, and can raise or lower the cutters, and, by releasing the levers, the catch will fly into one of the notches, and keep them at the adjusted height. The bar I is also adjustable on the lever by means of the series of holes at its top and the pin or screw passing through one of them and into or through the lifting-lever G.

The driving-wheel C works a pinion, *f*, which is on a shaft that carries also the bevel-gear K, a ratchet and pawl box, *g*, and a pinion, *h*. The bevel-gear K works into a bevel-pinion on the shaft L and turns said shaft. The forward end of the shaft L has upon it a crank-wheel, *i*, to which the pitman *j*, that drives the cutters *k*, is attached, and by which it receives motion.

The pinion *h* gears into and turns a gear-wheel, M, which drives the rake, and, that the rake may not be worked in the wrong direction, as it would be if the drive-wheel be backed in turning the machine, a ratchet and pawl are arranged in the box or drum *g*, which causes the pinion *h* to work as long as the machine advances; but, when backed, the ratchet slips, and there is no driving action in the pinion nor does the rake move.

To an arm, *m*, on the gear-wheel M is attached one end of a connecting-rod, N, the other end thereof being connected to a vibrating lever, O, that is pivoted at or rather fixed on a turning post, *o*, and that end of the vibrating lever O opposite to where the connecting-rod N is attached is fastened to a plate, P, the heel of which plate is also fastened to the turning post *o* so as to move with it. This plate P extends out underneath the platform B to or nearly to the extreme outer end thereof, and forms a support for the rake-rod *p*, which lies on top of it and between it and the under side of the platform or grain-table B.

The rake-rod or rake-stale *p* has a journal on it, which enters a bearing in the post *o*, and, while it always moves with the post, it has a rocking or rolling motion in its bearings, for the purpose of allowing the rake-teeth *q* to be projected up through the circular slots *r* in the grain-table, to catch and sweep off the grain and to rock or roll, to carry the teeth down below the plane of the grain-table when it returns for the next succeeding sweeping operation.

The rake-rod or rake-stale $p$ is locked or fastened, when in its sweeping and returning positions, by a spring-catch, $r'$, that takes into the recesses 1 2 alternately, in a projecting piece, Q, Fig. 2, on the turning post $o$; and, just at the end of the sweep of the rake, where it is to be turned either to throw up the teeth to set them for raking, or to turn them down so that the teeth may return to the front of the grain-table and underneath it for the succeeding sweeping operation, the tail $s$ of the spring-catch comes against the stationary piece R, which stops it, and the continued motion of the rake-rod releases itself from the catch, and can then be turned.

The turning of the rake-rod and the projecting and withdrawing of the rake-teeth are effected as follows: On the rake-rod are two tappets or projections, 3 4, and at each end of its circular sweep motion there is a stop, 5 6, one for each tappet. When the tappet 3 comes against the stop 5, the spring-latch at that moment having been thrown out, the rake-rod turns in its bearings a quarter-revolution or thereabout, and projects the rake-teeth $q$ up through the slots $r$. As the rake starts to sweep the platform the spring-catch is thrown in, and the rake is locked in its sweeping position, and moves the grain around and throws it off at the delivery-side thereof. At this point the tappet 4 comes against the stop 6, and, the spring-catch being again thrown out, the rake-rod turns and carries down the rake-teeth, and, in doing so, turns the teeth forward, not backward, and, by turning them forward, the teeth leave the grain in such a manner as not to dribble or drag it or otherwise tangle it.

The reel-posts S T are so secured to the main frame as that they may be inclined more or less as the reel may have to be moved forward or back, or up or down, to adapt it to the condition of the grain to be cut. The reel-shaft U is supported in these posts and driven by an endless belt passing over a pulley on the main axle and over the pulley V on the reel-shaft.

The reel-arms W and their braces X are secured to a casting, $t$, on the end of the reel-shaft, and thus, when the grain is caught by the reel arms or blades W, there is no central shaft to stop, catch, or wind it on.

On the extreme outer end of the rake-rod $p$, and outside of the outer fence Y, there is a long tooth, $u$, which extends above the top of the fence, and which catches and carries around with the rake any grain that may hang on or over the fence Y.

The platform or grain-table I contemplate making of sheet-metal circular strips, so laid down as to leave the spaces through which the teeth work. By so doing the under platform-frame may be in skeleton, and composed of three or four radial beams united at their outer ends by a curved piece or otherwise.

Having thus fully described my invention, what I claim therein as new, and desire to secure by Letters Patent, is—

1. In combination with a harvesting-machine having a circular platform and a rake rod or stale operated underneath said platform, the locking device consisting of the spring-bolt and recesses, substantially in the manner and for the purpose herein described and represented.

2. In combination with a rake for clearing the platform or grain-table of the cut grain thereon, a rake-tooth working outside of the outer fence of said platform, to sweep off and carry around any grain that may hang on said outer fence, substantially as described.

W. ANSON WOOD.

Witnesses:
C. A. CHENEY,
A. C. EDDY.